United States Patent [19]

Baker et al.

[11] Patent Number: 5,475,045
[45] Date of Patent: Dec. 12, 1995

[54] METHOD AND COMPOSITION FOR REDUCING EXTRACTABLE HEAVY METALS FROM VINYL HALIDE RESIN COMPOSITIONS

[75] Inventors: Paulette Baker, Chagrin Falls, Ohio; Richard F. Grossman, Wilmington, Del.

[73] Assignee: Synthetic Products Company, Shaker Heights, Ohio

[21] Appl. No.: 257,631

[22] Filed: Jun. 9, 1994

[51] Int. Cl.⁶ .................................................. C08K 5/09
[52] U.S. Cl. .................... 524/397; 524/399; 524/400
[58] Field of Search .............................. 524/396, 397, 524/399, 400; 528/271, 361, 308.6; 562/488

[56] References Cited

U.S. PATENT DOCUMENTS

| | | | |
|---|---|---|---|
| 2,985,624 | 5/1961 | Arndt | 528/308.6 |
| 3,108,135 | 10/1963 | De Pree | 562/488 |
| 3,245,948 | 4/1966 | Hendricks et al. | 524/396 |
| 3,355,471 | 11/1967 | Kebrich et al. | 524/396 |
| 3,933,740 | 1/1976 | Kopkins et al. | 524/396 |
| 4,008,193 | 2/1977 | Schiedl et al. | 524/400 |
| 4,101,523 | 7/1978 | Watanabe et al. | 528/309 |
| 4,269,743 | 5/1981 | Huyalkar et al. | . |
| 4,269,744 | 5/1981 | Hulyalkar et al. | . |
| 4,425,470 | 1/1984 | Garcia | 524/396 |
| 4,814,369 | 3/1989 | Baker | . |
| 4,925,883 | 5/1990 | Baker | . |
| 4,983,688 | 1/1991 | Jennings et al. | 525/389 |

FOREIGN PATENT DOCUMENTS 49-36821  10/1974  Japan .

*Primary Examiner*—Veronica P. Hoke
*Attorney, Agent, or Firm*—Wood, Herron & Evans

[57] ABSTRACT

A polymeric polyvalent metal aromatic polycarboxylate is used in vinyl halide resin compositions containing heavy metal stabilizers to reduce extractable heavy metals from molded resin products when tested by the toxicity characteristic leaching procedure (TCLP) of 40 CFR 261.

16 Claims, No Drawings

METHOD AND COMPOSITION FOR REDUCING EXTRACTABLE HEAVY METALS FROM VINYL HALIDE RESIN COMPOSITIONS

BACKGROUND OF THE INVENTION

Compositions based on polyvinyl chloride (PVC) and other halogenated polymers, such as chlorinated polyethylene (CPE) and chlorosulfonated polyethylene (CSPE), are commonly used for many useful articles such as wire or cable insulation, electrical component housings and electrical conductors. Insulated products include residential and commercial building wire; portable power cord and fixture wires; automotive primary (harness) wire; telephone and other communications wires; instrument and appliance wires; motor lead wires, etc. Compositions based on halogenated polymers typically provide required flame resistance, oil resistance, and resistance to environmental factors such as ozone and ultraviolet light to a greater extent than would similar nonhalogenated polymers (e.g., olefin polymers and copolymers). Therefore, the use of compositions based on halogenated polymers in useful products is widespread.

Presently, for example, the wire and cable industry has relied on insulating vinyl halide resins containing heat stabilizers based on lead compounds. Thus, electrically insulating polyvinyl chloride (PVC) compositions usually include dibasic lead phthalate, dibasic lead phosphite, tribasic lead sulfate, or lead stearate, among others, as heat stabilizers. With chlorinated polyethylene or chlorosulfonated polyethylene, litharge and red lead oxide are also used.

On Jun. 22, 1990, Part 261 of CFR 40, Protection of Environment, was amended to include (as Appendix II) Method 1311, Toxicity Characteristic Leaching Procedure (TCLP), as a prerequisite for any solid waste to be landfilled as nonhazardous waste. When tested per Method 1311, the solid waste must yield an extract containing less than 5.0 mg/l of lead.

Typical lead-stabilized PVC wire and cable compounds yield values of 2 to 10+ mg/l in this test, often depending on how finely divided the scrap is (round pellets tend to pass, flat flakes or powder tend to fail because of higher surface area per volume). Further, there is much data scatter. A landfill operation is, therefore, typically unwilling to accept values of 2–4 mg/l as evidence of nonhazardous character. Additives that could reduce the level of lead or other heavy metal extractables from PVC by the TCLP could have great commercial value.

SUMMARY OF THE INVENTION

The present invention is directed to vinyl halide resin compositions containing heavy metal stabilizers, such as lead compounds, having reduced extractable heavy metal. It has been found that the extractable lead levels of a molded vinyl halide resin composition having a lead stabilizer can be reduced by adding a polymeric polyvalent metal aromatic polycarboxylate in an effective amount to the resin composition.

In a preferred embodiment, the extractable lead of lead-stabilized PVC is substantially improved by including a minor amount of about 0.2 to 5 parts polymeric calcium terephthalate (CaT) per 100 parts of PVC.

The invention provides for greatly reduced extractable lead on exposure of molded PVC compositions to environmental landfill conditions. In particular, it has been found that a significant reduction of extractable heavy metals from vinyl halide resin compositions can be achieved by adding a polymeric polycarboxylate to the resin in an effective amount to reduce extraction of the heavy metals when exposed to the toxicity characteristic leaching procedure of 40 CFR 261. The function of the polyvalent metal polycarboxylate, such as calcium terephthalate, as an additive to reduce extractable heavy metals such as lead from vinyl halide resin compositions is unexpected and surprising.

The invention is particularly applicable to vinyl halide polymer compositions having lead stabilizers in electric wire or cable applications. In a broader aspect, the invention is applicable to all heavy metal stabilized vinyl halide resin products. The invention in these broader aspects, as well as specific embodiments and other parameters, may be further understood with reference to the following detailed description.

DETAILED DESCRIPTION OF THE INVENTION

A. Vinyl Halide Resin

The vinyl halide resin employed is most commonly a homopolymer of vinyl chloride, i.e.,polyvinyl chloride. It is to be understood, however, that this invention is not limited to a particular vinyl halide resin such as polyvinyl chloride or its copolymers. Other halogen-containing resins which are employed and which illustrate the principles of this invention include chlorinated polyethylene, chlorosulfonated polyethylene, chlorinated polyvinyl chloride, and other vinyl halide resin types. Vinyl halide resin, as understood herein, and as appreciated in the art, is a common term and is adopted to define those resins or polymers usually derived by polymerization or copolymerization of vinyl monomers including vinyl chloride with or without other comonomers such as ethylene, propylene, vinyl acetate, vinyl ethers, vinylidene chloride, methacrylate, acrylates, styrene, etc. A simple case is the conversion of vinyl chloride $H_2C=CHCl$ to polyvinyl chloride $(CH_2CHCl-)n$ wherein the halogen is bonded to the carbon atoms of the carbon chain of the polymer. Other examples of such vinyl halide resins would include vinylidene chloride polymers, vinyl chloride-vinyl ester copolymers, vinyl chloride-vinyl ether copolymers, vinyl chloride-vinylidene copolymers, vinyl chloride-propylene copolymers, chlorinated polyethylene, and the like. Of course, the vinyl halide commonly used in the industry is the chloride, although others such as bromide and fluoride may be used. Examples of the latter polymers include polyvinyl bromide, polyvinyl fluoride, and copolymers thereof.

B. Heavy Metal Compound Heat Stabilizers

Heavy metal compound heat stabilizers in vinyl halide resin compositions are well known. These metal compounds serve to capture HCl liberated during heat processing of the vinyl halide resin composition into its final shape. The heavy metal can be lead, cadmium, barium or antimony, for example. The stabilizers are usually metal salts of a carboxylic acid, advantageously of a $C_8$–$C_{24}$ carbon chain link monocarboxylic acid such lauric, oleic, stearic, octoic, or similar fatty acid salts. Mixed metal salts of such acids, and their preparation, are familiar to those skilled in the art to which this present invention pertains.

C. Polymeric Polyvalent Metal Salts of Aromatic Polycarboxylic Acids

The polymeric polyvalent metal aromatic polycarboxylates suitable for use in accordance with the principles of this invention may be derived from a broad class of compounds. In short, the term "polymeric metal carboxylate" is used hereinafter to define a member of this class.

The polymeric polyvalent metal salts are divalent, trivalent or higher valent metal salts of aromatic polycarboxylic acids exemplified by terephthalic, trimellitic, pyromellitic, trimesic and 2,6-naphthalene dicarboxylic acids. The metal cations of these salts include divalent calcium, magnesium, cadmium, zinc, lead, cobalt, strontium, barium, nickel, copper and tin ions; and the trivalent aluminum, cerium, indium, iron, cesium and chromium ions. Preferably, the metal cations include calcium, magnesium, strontium, barium, zinc and aluminum. Polyfunctional aromatic polycarboxylic acids useful in accordance with the principles of this invention may be exemplified by the aromatic nucleus of benzene, naphthalene, anthracene or the like. In a preferred form, the polymeric metal carboxylate includes the 1,4-benzene dicarboxylate group in the polymeric structure.

The essential criteria for the polymeric polyvalent metal salts of this invention are the polymeric nature of the aromatic polycarboxylate and its thermal stability at processing temperatures of the vinyl halide resin. Thus, it will be understood that while a number of polymeric salts have been actually exemplified hereinafter, others may be used to accomplish the purposes of this invention. It is believed that certain salts exist as substantially linear polymers in the divalent metal-dicarboxylate form with the equivalence of the oxygens bonded to the metal ion. However, other forms may be crosslinked where the functionality of the metal and carboxylates admit of crosslinking. Thus, the term "polymeric metal carboxylate" has been adopted to herein define this general class useful according to the broader aspects of the compositions and methods of this invention. The class of polymeric metal carboxylates suitable for use according to this invention all are characterized by heat stability at the processing temperatures of the vinyl halide polymer. The heat stabilities of polymeric metal terephthalate salts are exemplified by the decomposition temperatures listed in the following Table.

Decomposition Temperatures of
Polymeric Metal Terephthalates

| Metal | Decomposition Temperature |
| --- | --- |
| Aluminum | 540° C. |
| Barium | 640° C. |
| Cadmium | 430° C. |
| Calcium | 620° C. |
| Cobalt | 475° C. |
| Magnesium | 625° C. |
| Lead | 425° C. |
| Nickel | 440° C. |
| Strontium | 630° C. |
| Zinc | 430° C. |

All determine by means of TGA (termoravimetric analysis) under nitrogen at a heating rate of 10° C./minute.

Other polymeric metal carboxylates including polymeric metal terephthalates, trimesates, trimellitates, pyromellitates, isophthalates and others are disclosed in U.S. Pat. No. 4,983,688 and that disclosure is incorporated herein by reference.

D. Amounts of Components

Broad ranges of components of the vinyl halide resin compositions may be employed in the invention. In general, the polymeric metal carboxylate is used in an effective amount in the vinyl halide resin composition to reduce extractable heavy metals. Particularly useful compositions of the invention are achieved containing about 0.5 to about 5 parts of the metal compound heat stabilizer, about 0.2 to about 5 parts of the polymeric metal carboxylate, said parts on the basis of 100 parts of vinyl halide resin. The compositions of the present invention can also include various additional compounds including lubricants for providing the vinyl halide resin with lubricity and plasticizers of the phthalic ester or fatty acid ester type, hydrocarbon resins or chlorinated olefins or paraffins. Other additives may include auxiliary stabilizers, antioxidants, light stabilizers, pigments, dyes or extenders as disclosed in U.S. Pat. Nos. 4,269,743; 4,269,744; 4,814,369 and 4,925,883. The compositions may optionally contain an inorganic acid acceptor, such as various hydrotalcites and Type A hydrous zeolites, or coordinating multidentate metal blend ligands, such as 1,3-diketone, or an antioxidant such as bisphenol A, or a phosphite costabilizer such as diphenyl decyl phosphite. Fillers may be added including coarse ground limestone, fine ground limestone, clay, talc or other particulate fillers.

The advantages of this invention and its operating parameters will be further understood with reference to the following detailed examples.

EXAMPLE 1

A composition was mixed on a 2-roll mill comprising 100 parts by weight PVC; 50 phr di-isodecyl phthalate; 12 phr calcined clay; 4 phr antimony oxide; 6 phr dibasic lead phthalate; and 0.2 phr stearic acid. Such a composition is commonly used to insulate residential Type NM (nonmetallic) building wire. A 50 mil thickness sheet was subjected to TCLP analysis and 3.15 mg/l lead was found. The TCLP analysis of 40 CFR 261 is incorporated herein in its entirety by reference.

EXAMPLE 2

The composition of Example 1 was prepared and 2.0 phr calcium terephthalate added. The other ingredients were taken from the same lots as in Example 1 and the final sample had identical physical dimensions. TCLP analysis yielded 0.42 mg/l lead.

EXAMPLE 3

The composition of Example 2 was repeated, except for the use of barium terephthalate in place of calcium terephthalate. TCLP analysis yielded 0.48 mg/l lead.

EXAMPLES 4 AND 5

Nonlead PVC wire insulation stabilizers using calcium/zinc and barium/zinc in place of lead were used in place of dibasic lead phthalate in the recipe of Example 1 (as further controls). These used calcium and barium terephthalates, respectively, as part of the stabilizer formulation. In both cases, TCLP analysis yielded no detectable lead.

The above data demonstrates that minor amounts of a polymeric metal aromatic polycarboxylate such as polymeric calcium terephthalate will unexpectedly and surprisingly behave as an additive in vinyl halide resin compositions to reduce extractable heavy metals like lead, antimony, cadmium and barium. However, other polymeric metal carboxylates may be used in accordance with the above description in other vinyl halide resin compositions. The above examples are not intended to limit the invention. In accordance with the principles of this invention, halogenated polymers that are lead-stabilized, or contain other heavy metal compounds, may be landfillable as non-hazardous waste by adding an effective quantity of the polymeric polycarboxylate to pass the TCLP as provided in 40 CFR 261.

Having described this invention, its advantages and operating parameters, it will be obvious to persons of ordinary skill in the art, in view of the above description, that variations hereof may be made without departing from the spirit and scope thereof.

What is claimed is:

1. A vinyl halide resin composition comprising a vinyl halide resin, a heavy metal compound stabilizer for said resin and a polymeric polyvalent metal aromatic polycarboxylate, said aromatic polycarboxylate selected from the group consisting of terephthalate, trimesate, trimellitate, pyromellitate, isophthalate, and 2,6-naphthalene dicarboxylate, as an additive in an effective amount to reduce extraction of the heavy metal when said composition is exposed to the toxicity characteristic leaching procedure of 40 CFR 261.

2. The composition of claim 1 wherein said vinyl halide resin is selected from the group of polyvinylchloride, chlorinated polyethylene and chlorosulfonated polyethylene.

3. The composition of claim 1 wherein said polymeric polycarboxylate is polymeric calcium terephthalate.

4. The composition of claim 1 wherein said heavy metal compound is a metal salt of a higher fatty acid selected from a group consisting of antimony, cadmium, barium and lead, and mixtures thereof.

5. The composition of claim 1 wherein said metal compound stabilizer is present in an amount from about 0.5 to about 5 parts and said polymeric polycarboxylate is present in an amount from 0.2 to about 5 parts and said vinyl halide resin is present in amount of about 100 parts.

6. A vinyl halide resin composition comprising a polymer or copolymer of vinyl chloride, a metal salt of a higher fatty acid selected from the group consisting of lead, cadmium, barium, and antimony, and mixtures of said metal salts, and a polymeric polyvalent metal aromatic polycarboxylate, said aromatic polycarboxylate selected from the group consisting of terephthalate, trimesate, trimellitate, pyromellitate, isophthalate and 2,6-naphthalene dicarboxylate, as an additive in an effective amount to reduce extraction of the heavy metal when said composition is exposed to the toxicity characteristic leaching procedure of 40 CFR 261.

7. The composition of claim 6 wherein said polymeric polycarboxylate has a polyvalent metal selected from the group consisting of calcium, magnesium, strontium, barium, zinc and aluminum.

8. The composition of claim 7 wherein said polymeric polycarboxylate includes the 1,4-benzene dicarboxylate group in the polymeric structure.

9. The composition of claim 6 wherein the fatty acid is selected from the group consisting of stearic, oleic, octoic and lauric acids.

10. The composition of claim 6 wherein said polymeric polycarboxylate is in an amount of from about 0.2 to about 5 parts per 100 parts resin.

11. The composition of claim 6 wherein said polymeric polycarboxylate is polymeric calcium terephthalate.

12. A method for reducing extraction of heavy metals from a molded product of vinyl halide resin compositions comprising providing a vinyl halide resin composition containing a heavy metal compound stabilizer for said resin to produce a molded product, adding a polymeric polyvalent metal aromatic polycarboxylate, said aromatic polycarboxylate selected from the group consisting of terephthalate, trimesate, trimellitate, pyromellitate, isophthalate and 2,6-naphthalene dicarboxylate, as an additive in an effective amount to reduce extraction of the heavy metal when said molded product is exposed to the toxicity characteristic leaching procedure 40 CFR 261.

13. The method of claim 12 wherein said heavy metal compound is a metal salt of a higher fatty acid selected from a group consisting of antimony, cadmium, barium and lead, and mixtures thereof.

14. The method of claim 12 wherein said metal compound stabilizer is present in an amount from about 0.5 to about 5 parts and said polymeric polycarboxylate is present in an amount from 0.2 to about 5 parts and said vinyl halide resin is present in amount of about 100 parts.

15. The method of claim 12 wherein said polymeric polycarboxylate is polymeric calcium terephthalate.

16. The method of claim 15 wherein said polymeric polycarboxylate includes the 1,4-benzene dicarboxylate group in the polymeric structure.

* * * * *